(12) United States Patent
Chue et al.

(10) Patent No.: US 7,330,327 B1
(45) Date of Patent: Feb. 12, 2008

(54) SERVO WRITING A DISK DRIVE BY WRITING DISCONTINUOUS SPIRAL TRACKS TO PREVENT OVERHEATING

(75) Inventors: Jack M. Chue, Los Altos, CA (US); Siri S. Weerasooriya, Campbell, CA (US); Jai N. Subrahmanyam, San Diego, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 752 days.

(21) Appl. No.: 10/875,637

(22) Filed: Jun. 23, 2004

(51) Int. Cl.
*G11B 21/02* (2006.01)
*G11B 5/09* (2006.01)
*G11B 5/596* (2006.01)

(52) U.S. Cl. .................. 360/75; 360/51; 360/77.07

(58) Field of Classification Search ............. None
See application file for complete search history.

(56) References Cited

U.S. PATENT DOCUMENTS

| | | | |
|---|---|---|---|
| 5,430,661 A | 7/1995 | Fisher et al. |
| 5,576,906 A | 11/1996 | Fisher et al. |
| 5,583,712 A | 12/1996 | Brunelle |
| 5,668,679 A | 9/1997 | Swearingen et al. |
| 5,696,639 A | 12/1997 | Spurbeck et al. |
| 5,754,352 A | 5/1998 | Behrens et al. |
| 5,754,353 A | 5/1998 | Behrens et al. |
| 5,761,212 A | 6/1998 | Foland, Jr. et al. |
| 5,831,888 A | 11/1998 | Glover |
| 5,838,512 A | 11/1998 | Okazaki |
| 5,917,670 A | 6/1999 | Scaramuzzo et al. |
| 6,021,012 A | 2/2000 | Bang |
| 6,023,386 A | 2/2000 | Reed et al. |
| 6,069,499 A | 5/2000 | Cho et al. |
| 6,091,564 A | 7/2000 | Codilian et al. |
| 6,101,229 A | 8/2000 | Glover |
| 6,181,506 B1 | 1/2001 | Shimura et al. |
| 6,191,906 B1 | 2/2001 | Buch |
| 6,249,395 B1 | 6/2001 | Conway |
| 6,249,896 B1 | 6/2001 | Ho et al. |
| 6,272,194 B1 | 8/2001 | Sakamoto |
| 6,292,318 B1 | 9/2001 | Hayashi |
| 6,304,407 B1 | 10/2001 | Baker et al. |
| 6,366,225 B1 | 4/2002 | Ozdemir |
| 6,411,452 B1 | 6/2002 | Cloke |
| 6,411,453 B1 | 6/2002 | Chainer et al. |

(Continued)

OTHER PUBLICATIONS

Notice of Allowance dated Jun. 28, 2005 from U.S. Appl. No. 10/769,387, 10 pages.

(Continued)

*Primary Examiner*—William R. Korzuch
*Assistant Examiner*—Jason Olson
(74) *Attorney, Agent, or Firm*—Howard H. Sheerin, Esq.

(57) ABSTRACT

A method of servo writing a disk for use in a disk drive is disclosed by writing discontinuous spiral tracks on the disk to protect against overheating the head and/or preamp circuitry. A write clock is synchronized to the rotation of the disk, and a plurality of discontinuous spiral tracks are written on the disk. Each discontinuous spiral track is written at a predetermined circular location determined from the write clock, and each discontinuous spiral track comprises a plurality of segments separated by gaps. Each segment comprises a high frequency signal interrupted at a predetermined interval by a sync mark.

24 Claims, 16 Drawing Sheets

U.S. PATENT DOCUMENTS

| | | |
|---|---|---|
| 6,429,989 B1 | 8/2002 | Schultz et al. |
| 6,487,032 B1 | 11/2002 | Cloke et al. |
| 6,507,450 B1 | 1/2003 | Elliott |
| 6,519,107 B1 | 2/2003 | Ehrlich et al. |
| 6,587,293 B1 | 7/2003 | Ding et al. |
| 6,603,622 B1 | 8/2003 | Christiansen et al. |
| 6,704,156 B1 | 3/2004 | Baker et al. |
| 6,738,205 B1 | 5/2004 | Moran et al. |
| 6,771,443 B2 | 8/2004 | Szita et al. |
| 6,791,777 B2 | 9/2004 | Watanabe et al. |
| 6,882,486 B1 | 4/2005 | Kupferman |
| 6,920,004 B1 * | 7/2005 | Codilian et al. ............... 360/51 |
| 6,943,978 B1 | 9/2005 | Lee |
| 6,965,489 B1 | 11/2005 | Lee et al. |
| 6,967,799 B1 | 11/2005 | Lee |
| 6,985,316 B1 | 1/2006 | Liikanen et al. |
| 6,987,636 B1 | 1/2006 | Chue et al. |
| 6,989,954 B1 | 1/2006 | Lee et al. |
| 7,002,761 B1 | 2/2006 | Sutardja et al. |
| 7,016,134 B1 | 3/2006 | Agarwal et al. |
| 7,023,631 B2 | 4/2006 | Zhang et al. |
| 7,054,083 B2 | 5/2006 | Ehrlich |
| 7,068,461 B1 | 6/2006 | Chue et al. |
| 7,088,533 B1 | 8/2006 | Shepherd et al. |
| 7,133,239 B1 * | 11/2006 | Hartman et al. ............... 360/75 |
| 7,212,364 B1 | 5/2007 | Lee |
| 2001/0010604 A1 | 8/2001 | Esumi |
| 2003/0030929 A1 | 2/2003 | Ozdemir |

OTHER PUBLICATIONS

Notice of Allowance dated Apr. 13, 2005 from U.S. Appl. No. 10/769,680, 8 pages.
Office Action dated May 18, 2005 from U.S. Appl. No. 10/769,386, 5 pages.
Office Action dated Aug. 22, 2005 from U.S. Appl. No. 10/769,386, 9 pages.
Notice of Allowance dated Mar. 23, 2006 from U.S. Appl. No. 10/769,386, 7 pages.
Office Action dated Jul. 17, 2006 from U.S. Appl. No. 10/769,386, 9 pages.
Notice of Allowance dated Feb. 7, 2007 from U.S. Appl. No. 10/769,386, 10 pages.

* cited by examiner

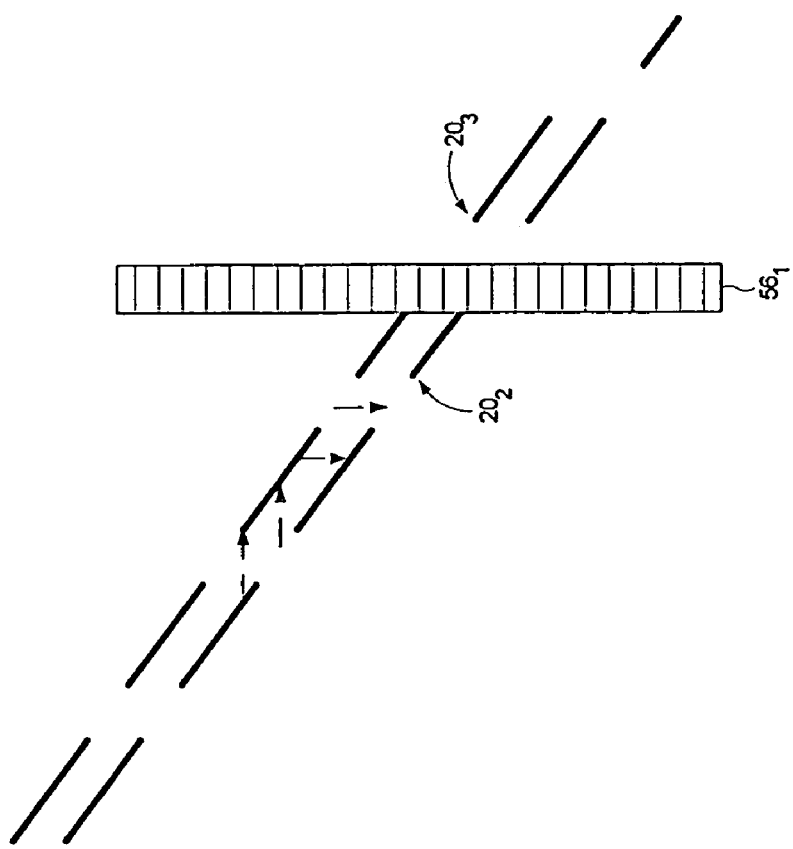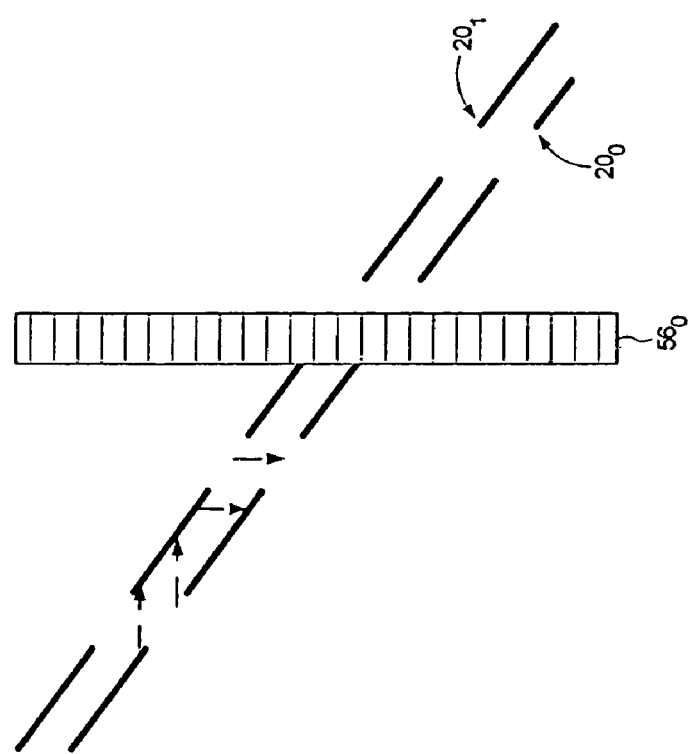
FIG. 6B

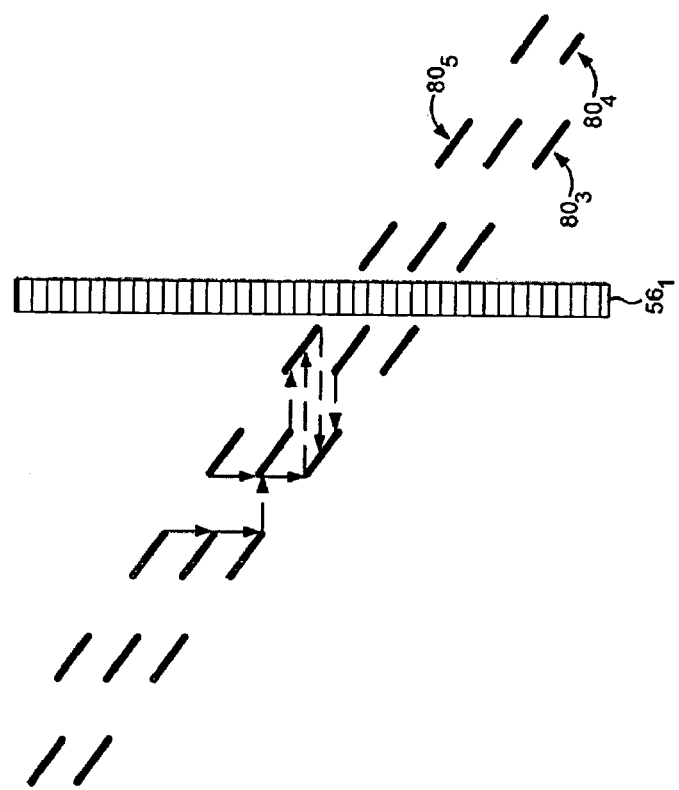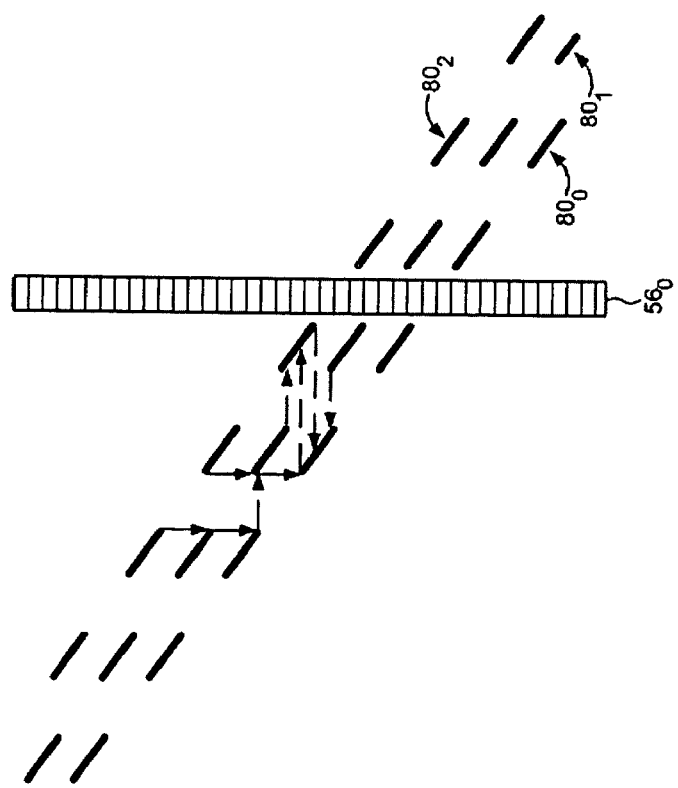
FIG. 8B

SERVO WRITING A DISK DRIVE BY WRITING DISCONTINUOUS SPIRAL TRACKS TO PREVENT OVERHEATING

CROSS REFERENCE TO RELATED APPLICATIONS AND PATENTS

This application is related to other co-pending U.S. patent applications including Ser. No. 10/769,387 entitled "USING AN EXTERNAL SPIRAL SERVO WRITER TO WRITE REFERENCE SERVO SECTORS AND SPIRAL TRACKS TO A DISK TO FACILITATE WRITING PRODUCT SERVO SECTORS TO THE DISK" filed on Jan. 30, 2004, Ser. No. 10/769,680 entitled "SERVO WRITING A DISK DRIVE BY SYNCHRONIZING A SERVO WRITE CLOCK TO A HIGH FREQUENCY SIGNAL IN A SPIRAL TRACK" filed on Jan. 30, 2004, and Ser. No. 10/769,386 entitled "SERVO WRITING A DISK DRIVE BY SYNCHRONIZING A SERVO WRITE CLOCK IN RESPONSE TO A SYNC MARK RELIABILITY METRIC" filed on Jan. 31, 2004, the disclosures of which are incorporated herein by reference.

BACKGROUND OF THE INVENTION

1. Field of the Invention

The present invention relates to disk drives. More particularly, the present invention relates to servo writing a disk drive by writing discontinuous spiral tracks to prevent overheating.

2. Description of the Prior Art

When manufacturing a disk drive, product servo sectors $2_0$-$2_N$ are written to a disk 4 which define a plurality of radially-spaced, concentric data tracks 6 as shown in the prior art disk format of FIG. 1. Each product servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. During normal operation, the servo bursts 14 are processed by the disk drive in order to maintain a head over a centerline of a target track while writing or reading data. In the past, external servo writers have been used to write the product servo sectors $2_0$-$2_N$ to the disk surface during manufacturing. External servo writers employ extremely accurate head positioning mechanics, such as a laser interferometer, to ensure the product servo sectors $2_0$-$2_N$ N are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the product servo sectors independent of an external servo writer. For example, U.S. Pat. No. 5,668,679 teaches a disk drive which performs a self-servo writing operation by writing a plurality of spiral tracks to the disk which are then processed to write the product servo sectors along a circular path. Each spiral track is written to the disk as a high frequency signal (with missing bits), wherein the position error signal (PES) for tracking is generated relative to time shifts in the detected location of the spiral tracks. However, writing a high frequency signal in a continuous spiral track can damage the head and/or preamp circuitry due to overheating.

There is, therefore, a need to write spiral tracks on the disk of a disk drive without overheating the head and/or preamp circuitry.

SUMMARY OF THE INVENTION

The present invention may be regarded as a method of writing discontinuous spiral tracks on a disk for use in a disk drive. A write clock is synchronized to the rotation of the disk, and a plurality of discontinuous spiral tracks are written on the disk. Each discontinuous spiral track is written at a predetermined circular location determined from the write clock, and each discontinuous spiral track comprises a plurality of segments separated by gaps. Each segment comprises a high frequency signal interrupted at a predetermined interval by a sync mark.

In one embodiment, the disk drive comprises an actuator arm and a head coupled to a distal end of the actuator arm, and the head is used to write the discontinuous spiral tracks on the disk. In one embodiment, an external servo writer is used to write the discontinuous spiral tracks on the disk.

In yet another embodiment, the gaps within each discontinuous spiral track occur at a position determined from the write clock, and in one embodiment, the gaps occur at substantially the same circular location within each of the discontinuous spiral tracks such that the gaps are aligned radially across the disk.

In still another embodiment, along a circular path on the disk a gap in a first discontinuous spiral track overlaps a segment in a second discontinuous track.

The present invention may also be regarded as a method of writing product servo sectors on a disk of a disk drive. The disk drive comprises control circuitry and a head disk assembly (HDA) comprising the disk, an actuator arm, a head coupled to a distal end of the actuator arm, and a voice coil motor for rotating the actuator arm about a pivot to position the head radially over the disk. The disk comprises a plurality of discontinuous spiral tracks, wherein each discontinuous spiral track comprises a plurality of segments separated by gaps and each segment comprises a high frequency signal interrupted at a predetermined interval by a sync mark. The head internal to the disk drive is used to read the sync marks in the segments of the discontinuous spiral tracks to synchronize a servo write clock. The servo write clock is used to write product servo sectors to the disk.

In one embodiment, each product servo sector is written over at least part of the gaps in the discontinuous spiral tracks. In one embodiment, a width of each gap along a circular path of the disk is substantially equal to a width of a product servo sector along the circular path of the disk.

The present invention may also be regarded as a disk drive comprising a disk having a plurality of discontinuous spiral tracks, wherein each discontinuous spiral track comprises a plurality of segments separated by gaps and each segment comprises a high frequency signal interrupted at a predetermined interval by a sync mark. The disk drive further comprises an actuator arm, a head coupled to a distal end of the actuator arm, and a voice coil motor for rotating the actuator arm about a pivot to position the head radially over the disk. Control circuitry within the disk drive reads the sync marks in the segments of the discontinuous spiral tracks to synchronize a servo write clock, and uses the servo write clock to write product servo sectors to the disk.

BRIEF DESCRIPTION OF THE DRAWINGS

FIG. 6B shows an embodiment of the present invention wherein a wedge of product servo sectors is written for every pair of discontinuous spiral tracks.

FIG. 8B shows an embodiment wherein a width of a product servo sector is less than the gap width.

DESCRIPTION OF THE PREFERRED EMBODIMENTS

Figure 2:
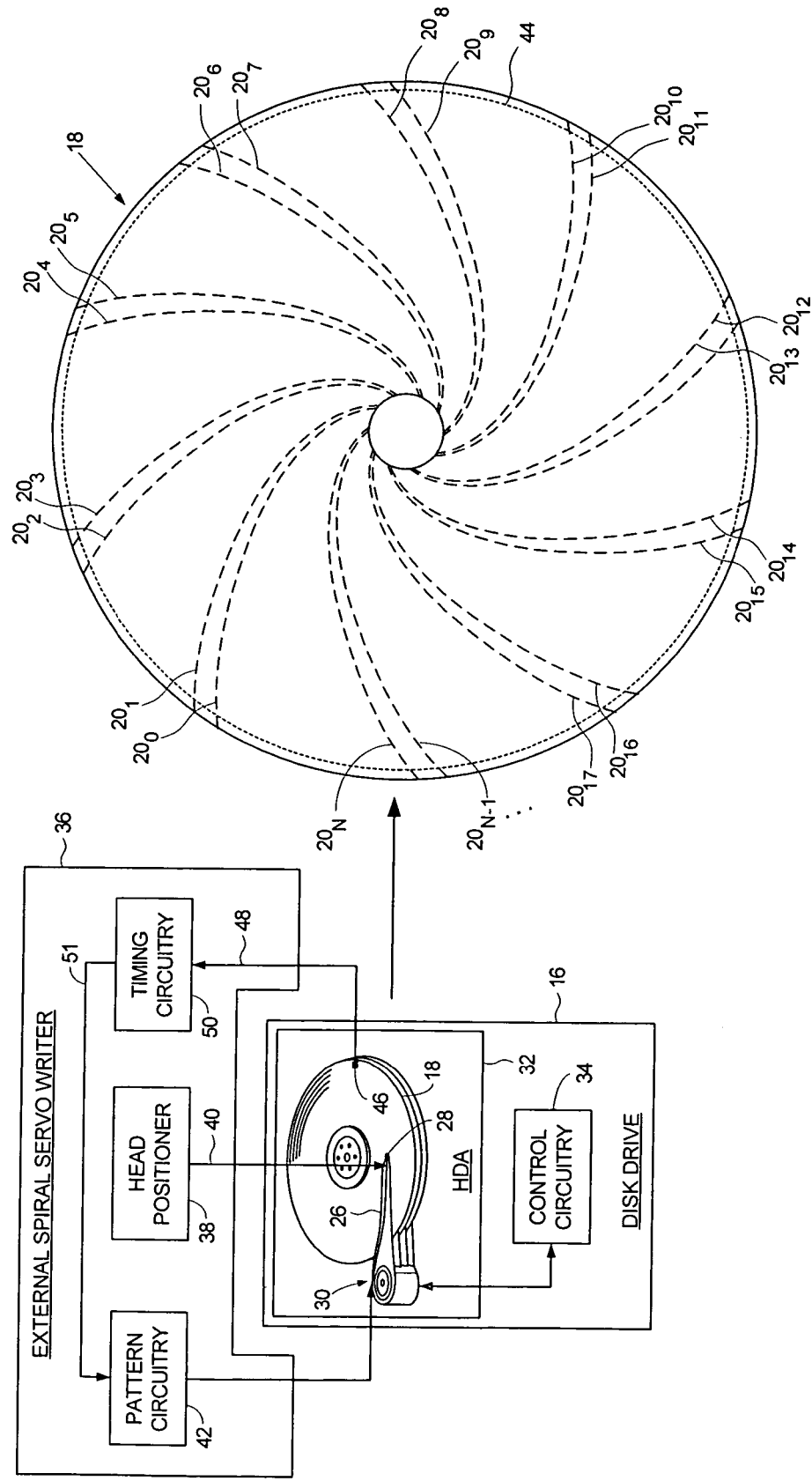
FIGS. 2A-2B show an embodiment of the present invention wherein an external spiral servo writer is used to write a plurality of discontinuous spiral tracks on the disk of a disk drive.

FIGS. 2A-2B show a technique according to an embodiment of the present invention for writing discontinuous spiral tracks on a disk 18 for use in a disk drive 16. A write clock is synchronized to the rotation of the disk 18, and a plurality of discontinuous spiral tracks $20_0$-$20_N$ are written on the disk. Each discontinuous spiral track $20_i$ is written at a predetermined circular location determined from the write clock, and each discontinuous spiral track $20_i$ comprises a plurality of segments separated by gaps (FIG. 4B). Each segment comprises a high frequency signal 22 interrupted at a predetermined interval by a sync mark 24 (FIG. 5B).

In the embodiment of FIG. 2A, the disk 18, actuator arm 26, head 28 and voice coil motor 30 are enclosed in a head disk assembly (HDA) 32 of the disk drive 16. The disk drive 16 further comprises control circuitry 34 mounted on a printed circuit board for controlling operation of the disk drive 16. In one embodiment, the control circuitry 34 writes the discontinuous spiral tracks $20_0$-$20_N$ to the disk 18 and then processes the discontinuous spiral tracks $20_0$-$20_N$ to write the product servo sectors to the disk 18.

In the embodiment shown in FIG. 2A, an external servo writer 36 is used to write the discontinuous spiral tracks $20_0$-$20_N$ to the disk 18. The external spiral servo writer 36 comprises a head positioner 38 for actuating a head positioning pin 40 using sensitive positioning circuitry, such as a laser interferometer. Pattern circuitry 42 generates the data sequence written to the disk 18 for the discontinuous spiral tracks $20_0$-$20_N$. The external spiral servo writer 36 inserts a clock head 46 into the HDA 32 for writing a clock track 44 (FIG. 2B) at an outer diameter of the disk 18. The clock head 46 then reads the clock track 44 to generate a clock signal 48 processed by timing recovery circuitry 50 to synchronize a write clock 51 for writing the discontinuous spiral tracks $20_0$-$20_N$ to the disk 18. The timing recovery circuitry 50 enables the pattern circuitry 42 at the appropriate time relative to the write clock 51 so that the discontinuous spiral tracks $20_0$-$20_N$ are written at the appropriate circular location. The timing recovery circuitry 50 also enables the pattern circuitry 42 relative to the write clock 51 to write the sync marks 24 (FIG. 5B) within the discontinuous spiral tracks $20_0$-$20_N$ at the same circular location from the outer diameter to the inner diameter of the disk 18. As described below, the constant interval between sync marks 24 (independent of the radial location of the head 28) enables a servo write clock to maintain synchronization while writing the product servo sectors to the disk 18.

Figure 3:
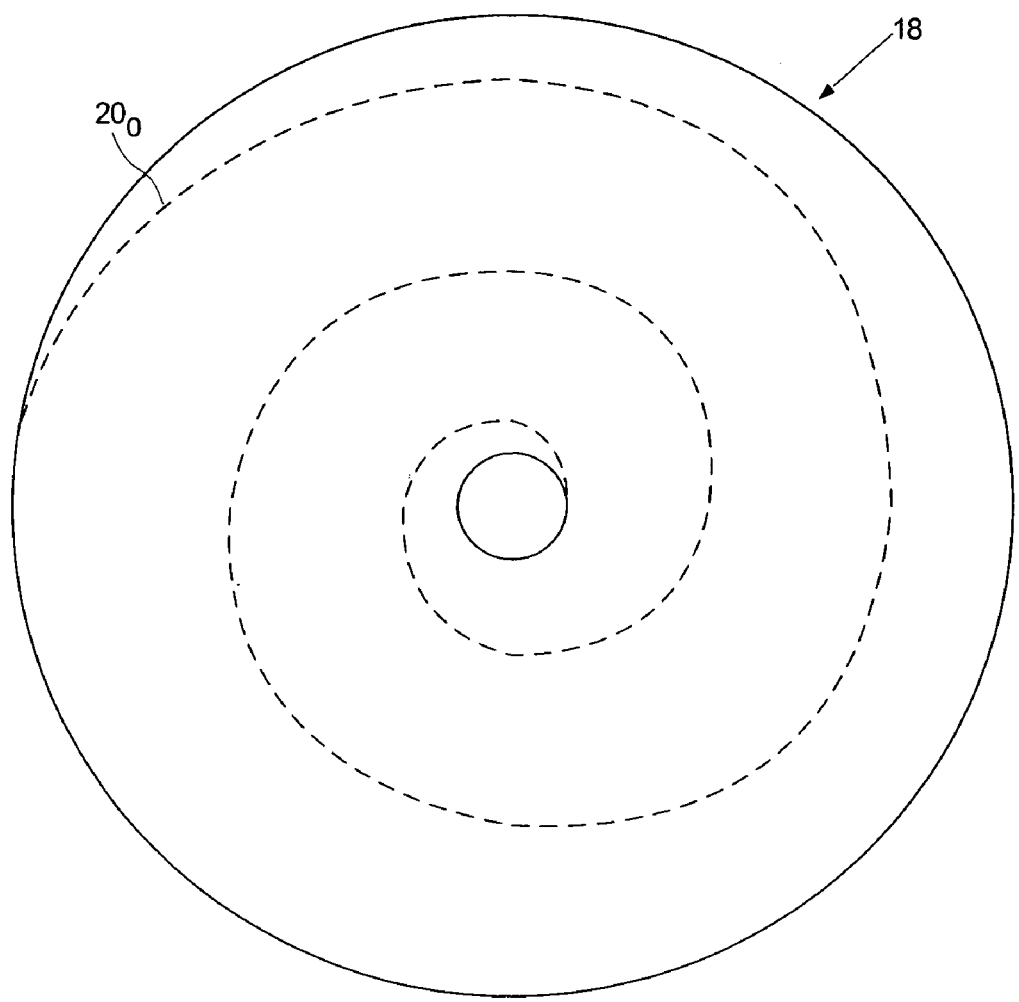
FIG. 3 illustrates an embodiment of the present invention wherein each discontinuous spiral track is written over multiple revolutions of the disk.

In the embodiment of FIG. 2B, each discontinuous spiral track $20_i$ is written over a partial revolution of the disk 18. In an alternative embodiment, each discontinuous spiral track $20_i$ is written over one or more revolutions of the disk 18. FIG. 3 shows an embodiment wherein each discontinuous spiral track $20_i$ is written over multiple revolutions of the disk 18. In the embodiment of FIG. 2A, the entire disk drive 16 is shown as being inserted into the external spiral servo writer 36. In an alternative embodiment, only the HDA 32 is inserted into the external spiral servo writer 36. In yet another embodiment, an external media writer is used to write the discontinuous spiral tracks $20_0$-$20_N$ to a number of disks 18, and one or more of the disks 18 are then inserted into an HDA 32.

Figure 4A:
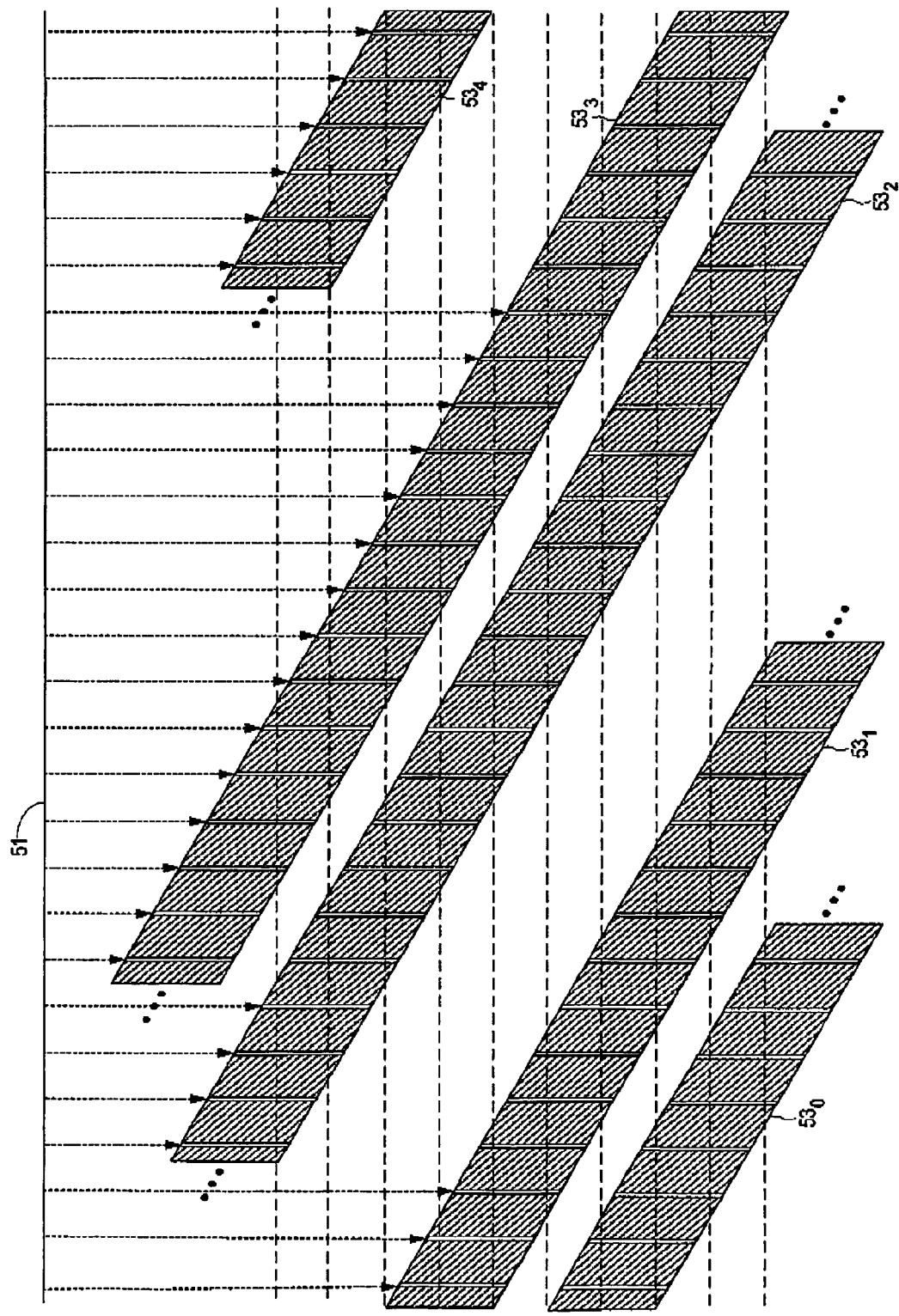
FIG. 4A shows writing of continuous spiral tracks (no gaps) illustrating the sync marks being aligned in the radial direction.
Figure 4B:
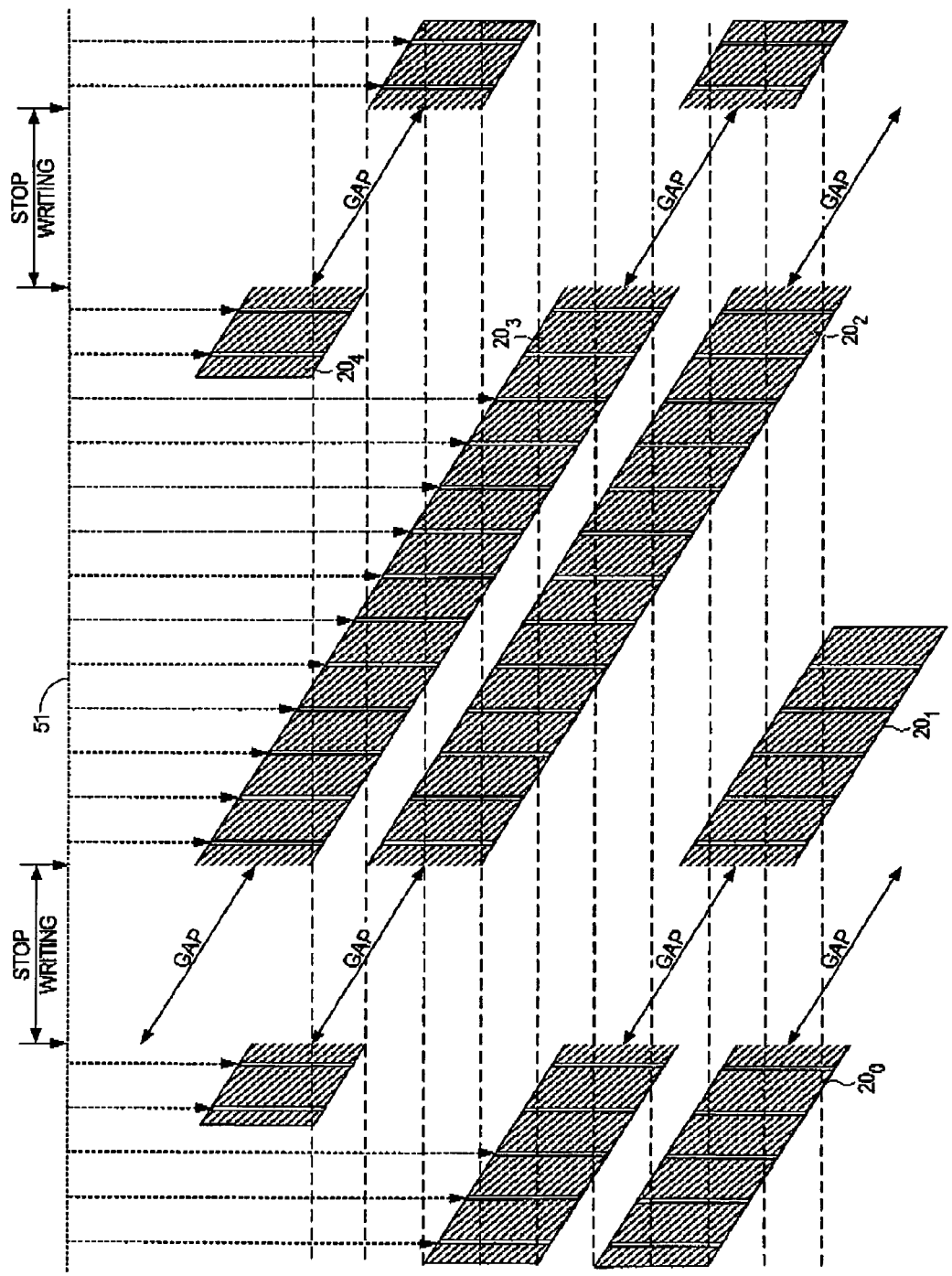
FIG. 4B shows an embodiment of the present invention wherein discontinuous spiral tracks are written as segments separated by gaps, wherein the gaps occur at substantially the same circular location within each of the discontinuous spiral tracks such that the gaps are aligned radially across the disk.

FIG. 4A illustrates the writing of continuous spiral tracks $53_0$-$53_N$ to the disk 18, wherein the sync marks are written at predetermined values of the write clock 51. Thus, each continuous spiral track $53_0$-$53_N$ is written as a continuous high frequency signal interrupted at a predetermined interval by a sync mark. In comparison, FIG. 4B illustrates the writing of discontinuous spiral tracks $20_0$-$20_N$ comprising segments separated by gaps, wherein each segment comprises a high frequency signal interrupted at a predetermined interval by a sync mark. In the embodiment of FIG. 4B, the gaps occur at the same circular location (as determined from the write clock 51) within each of the discontinuous spiral tracks $20_0$-$20_N$ such that the gaps are aligned radially across the disk 18. Writing segments of a high frequency signal separated by gaps helps protect against overheating the head and/or preamp circuitry as compared to the prior art technique of writing the spiral tracks as a continuous stream of high frequency transitions.

After the external spiral servo writer 36 writes the discontinuous spiral tracks $20_0$-$20_N$ to the disk 18, the head positioning pin 40 and clock head 46 are removed from the HDA 32 and the product servo sectors are written to the disk 18. In one embodiment, the control circuitry 34 within the disk drive 16 is used to process the discontinuous spiral tracks $20_0$-$20_N$ in order to write the product servo sectors to the disk 18. In an alternative embodiment described below with reference to FIGS. 9 and 10, an external product servo writer is used to process the discontinuous spiral tracks $20_0$-$20_N$ in order to write the product servo sectors to the disk 18 during a "fill operation".

FIG. 5B illustrates an "eye" pattern in the read signal that is generated when the head 28 passes over a segment in one of the discontinuous spiral tracks $20_i$. The read signal comprises high frequency transitions 22 interrupted at a predetermined interval by sync marks 24. When the head 28 moves in the radial direction, the eye pattern will shift (left or right) while the sync marks 24 remain fixed. The shift in the eye pattern (detected from the high frequency signal 22) relative to the sync marks 24 provides the off-track information (position error signal or PES) for servoing the head 28.

Figure 5A:
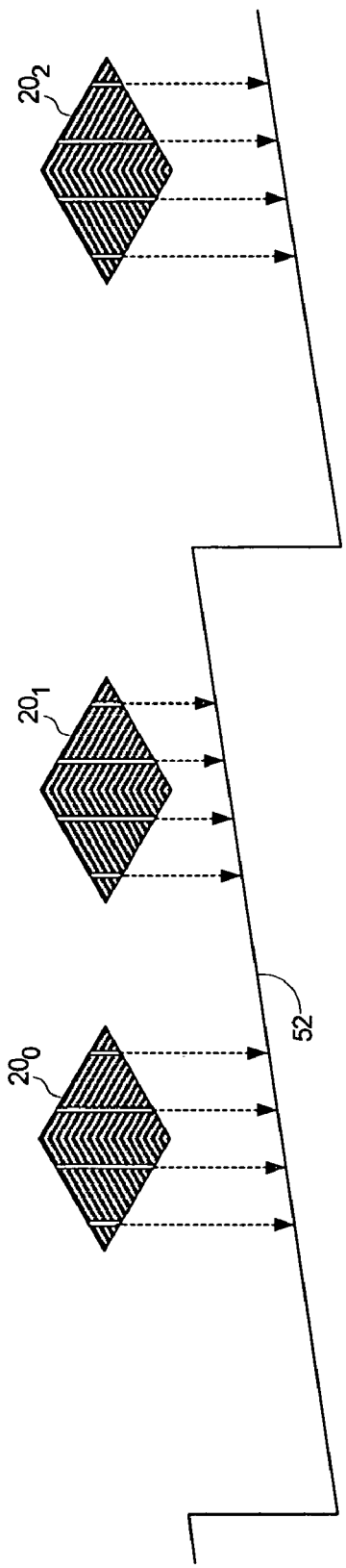
FIG. 5A illustrate an eye pattern that is generated when reading the discontinuous spiral tracks together with a saw-tooth waveform generated by clocking a modulo-N counter with a servo write clock.
Figure 5B:
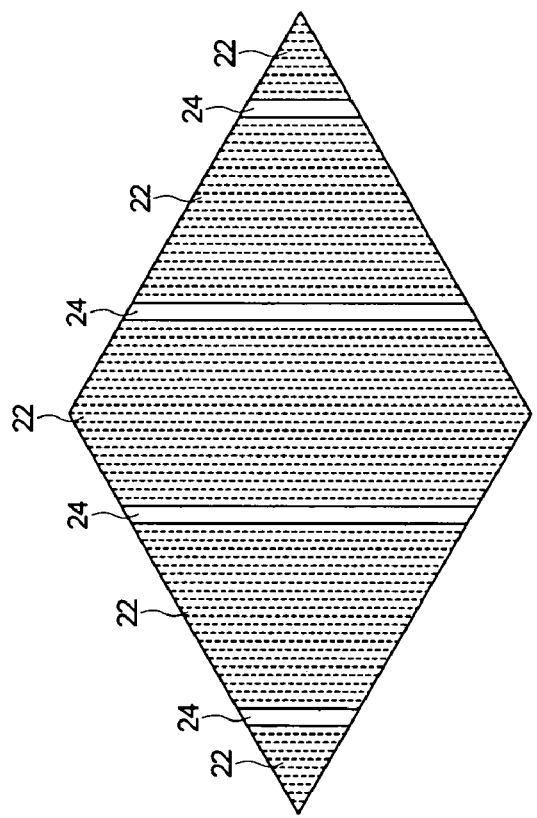
FIG. 5B shows an enlarged view of the eye pattern comprising a high frequency signal interrupted at a predetermined interval by a sync mark.

FIG. 5A shows an embodiment of the present invention wherein a saw-tooth waveform 52 is generated by clocking a modulo-N counter with a servo write clock, wherein the frequency of the servo write clock is adjusted until the sync marks 24 in the spiral tracks $20_0$-$20_N$ are detected at a target modulo-N count value. The servo write clock may be generated using any suitable circuitry, such as a phase locked loop (PLL). As each sync mark 24 in the discontinuous spiral tracks $20_0$-$20_N$ is detected, the value of the modulo-N counter represents the phase error for adjusting the PLL. In one embodiment, the PLL is updated when any one of the sync marks 24 within the eye pattern is detected. In this manner the multiple sync marks 24 in each eye pattern (each spiral track crossing) provides redundancy so that the PLL is still updated if one or more of the sync marks 24 are missed due to noise in the read signal. Once the sync marks 24 are detected at the target modulo-N count values, the servo write clock is coarsely locked to the desired frequency for writing the product servo sectors to the disk 18.

Figure 1:
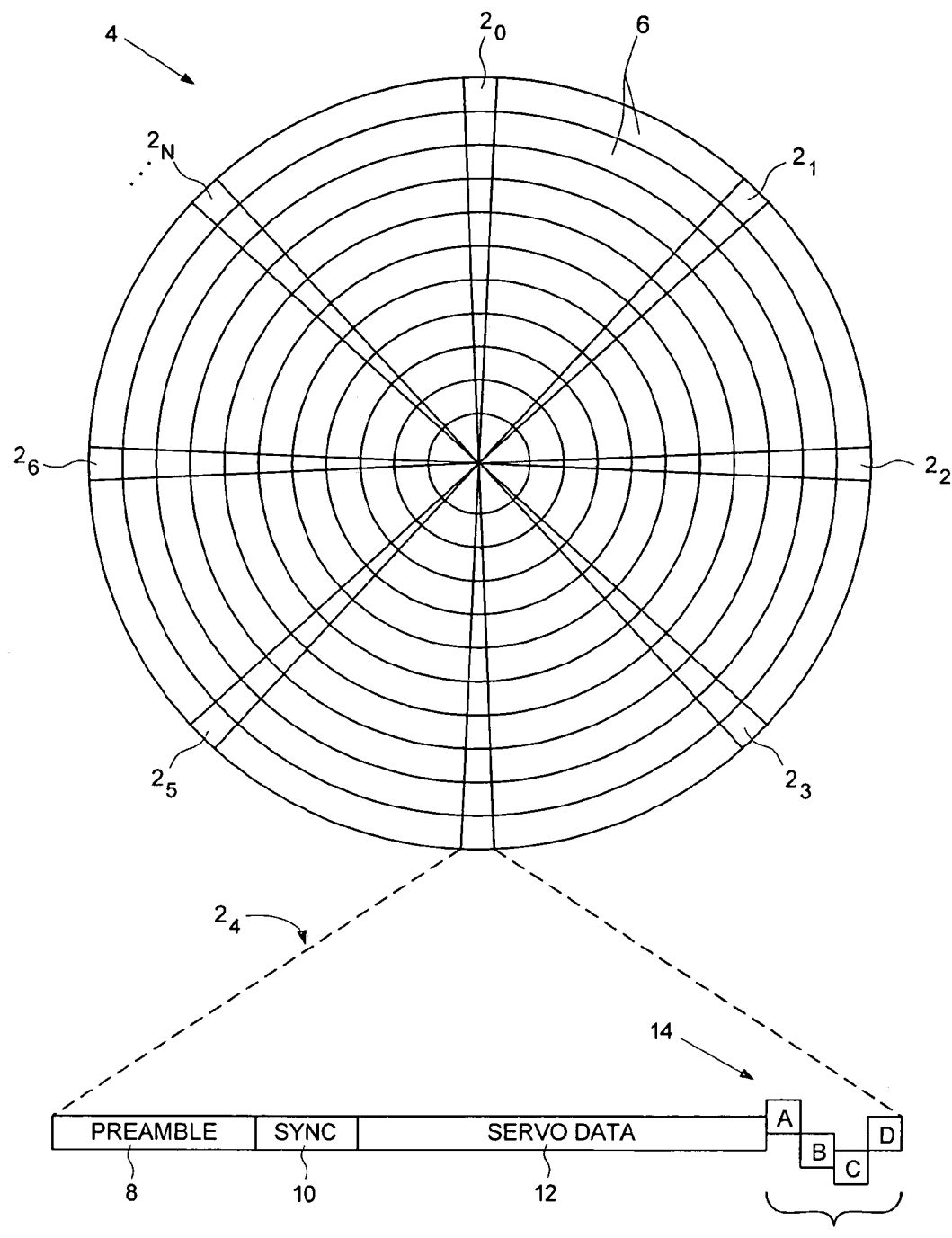
FIG. 1 shows a prior art disk format comprising a plurality of tracks defined by a plurality of embedded product servo sectors.

The sync marks 24 in the discontinuous spiral tracks $20_0$-$20_N$ may comprise any suitable pattern, and in one embodiment, a pattern that is substantially shorter than the sync mark 10 in the conventional product servo sectors 2 of FIG. 1. A shorter sync mark 24 allows the discontinuous spiral tracks $20_0$-$20_N$ to be written to the disk 18 using a steeper slope (by moving the head faster from the outer diameter to the inner diameter of the disk 18) which reduces the time required to write each discontinuous spiral track $20_0$-$20_N$.

In one embodiment, the servo write clock is further synchronized by generating a timing recovery measurement from the high frequency signal 22 between the sync marks 24 in the discontinuous spiral tracks $20_0$-$20_N$. Synchronizing the servo write clock to the high frequency signal 22 helps maintain proper radial alignment (phase coherency) of the Gray coded track addresses in the product servo sectors. The timing recovery measurement may be generated in any suitable manner. In one embodiment, the servo write clock is used to sample the high frequency signal 22 and the signal sample values are processed to generate the timing recovery measurement. The timing recovery measurement adjusts the phase of the servo write clock (PLL) so that the high frequency signal 22 is sampled synchronously. In this manner, the sync marks 24 provide a coarse timing recovery measurement and the high frequency signal 22 provides a fine timing recovery measurement for maintaining synchronization of the servo write clock. Further details of this embodiment are disclosed in the above referenced patent application entitled "SERVO WRITING A DISK DRIVE BY SYNCHRONIZING A SERVO WRITE CLOCK TO A HIGH FREQUENCY SIGNAL IN A SPIRAL TRACK".

Figure 5C:
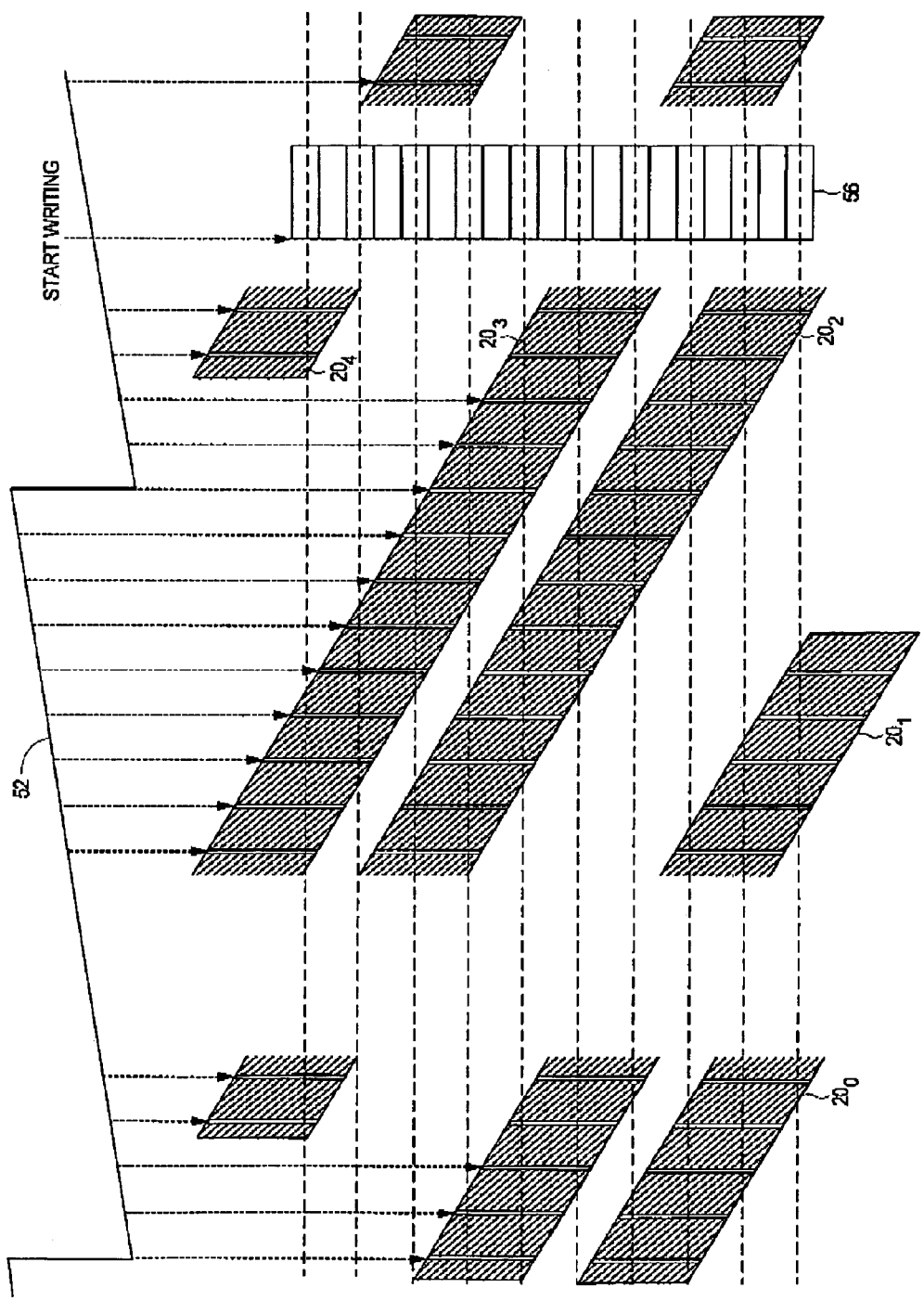
FIG. 5C shows an embodiment of the present invention wherein the product servo sectors are written over the gaps in the discontinuous spiral tracks.

FIG. 5C illustrates how the product servo sectors are written to the disk 18 after synchronizing the servo write clock in response to the high frequency signal 22 and the sync marks 24 in the discontinuous spiral tracks $20_0$-$20_N$. In the embodiment of FIG. 5C, the dashed lines represent the centerlines of the data tracks. The sync marks in the discontinuous spiral tracks $20_0$-$20_N$ are written so that there is a shift of two sync marks in the eye pattern (FIG. 5B) between data tracks. In an alternative embodiment, the sync marks in the discontinuous spiral tracks $20_0$-$20_N$ are written so that there is a shift of N sync marks in the eye pattern between data tracks. In the embodiment of FIG. 5C, each discontinuous spiral track $20_0$-$20_N$ is wider than a data track, however, in an alternative embodiment the width of each discontinuous spiral track $20_0$-$20_N$ is less than or proximate the width of a data track.

The position error signal (PES) for maintaining the head 28 along a servo track (tracking) may be generated from the discontinuous spiral tracks $20_0$-$20_N$ in any suitable manner. In one embodiment, the PES is generated by detecting the eye pattern in FIG. 5B using an envelope detector and detecting a shift in the envelope relative to the sync marks 24. In one embodiment, the envelope is detected by integrating the high frequency signal 22 and detecting a shift in the resulting ramp signal. In an alternative embodiment, the high frequency signal 22 between the sync marks 24 in the discontinuous spiral tracks are demodulated as servo bursts and the PES generated by comparing the servo bursts in a similar manner as the servo bursts 14 in the product servo sectors (FIG. 1).

Once the head 28 is tracking on a servo track, the product servo sectors are written to the disk using the servo write clock. Write circuitry is enabled when the modulo-N counter (saw-tooth waveform 52) reaches a predetermined value, wherein the servo write clock clocks the write circuitry to write the product servo sector (e.g., product servo sectors 56) to the disk. FIG. 5C also illustrates an embodiment of the present invention wherein each product servo sector is written over at least part of the gaps in the discontinuous spiral tracks $20_0$-$20_N$ In this manner, the product servo sectors (e.g., product servo sectors 56) do not overwrite a segment of the discontinuous spiral track $20_0$-$20_N$ that could otherwise be used for synchronizing the servo write clock and for generating the tracking PES.

Figure 6A:
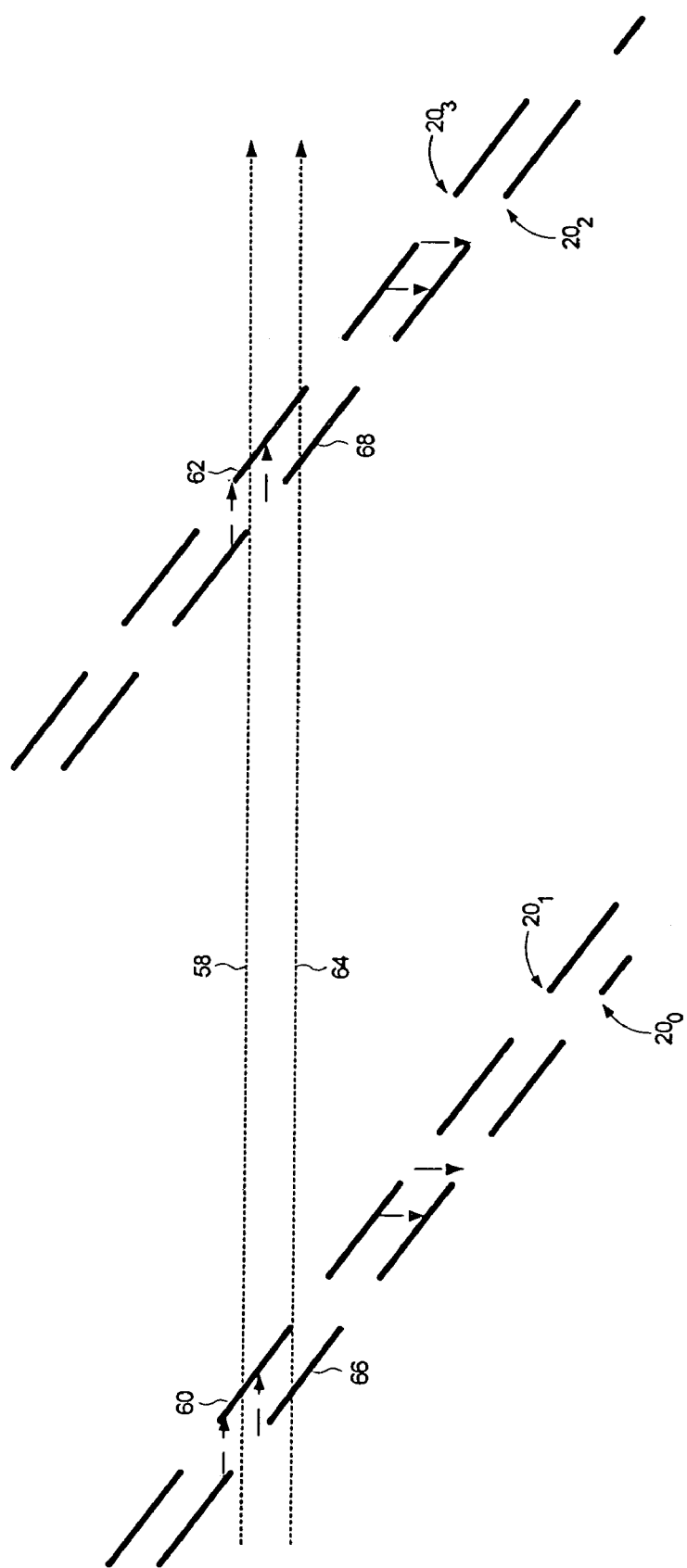
FIG. 6A further illustrates the embodiment wherein the gaps are aligned radially across the disk and along a circular path on the disk a gap in a first discontinuous spiral track overlaps a segment in a second discontinuous track.

The discontinuous spiral tracks $20_0$-$20_N$ in the embodiment of FIG. 5C are processed in an interleaved manner to account for the gaps. This is further illustrated in FIG. 6A which shows the discontinuous spiral tracks written as pairs of tracks (e.g., $20_0$-$20_1$ and $20_2$-$20_3$). In this embodiment, along a circular path on the disk 18 a gap in a first discontinuous spiral track (e.g., $20_0$) overlaps a segment in a second discontinuous track (e.g., $20_1$). Thus, when servoing along circular path 58, segment 60 in discontinuous spiral track $20_1$ and segment 62 in discontinuous spiral track $20_3$ are read to synchronize the servo write clock and generate the tracking PES, and when servoing along circular path 64, segment 66 in discontinuous spiral track $20_0$ and segment 68 in discontinuous spiral track $20_2$ are read to synchronize the servo write clock and generate the tracking PES. FIG. 6A also illustrates the embodiment wherein the gaps occur at substantially the same circular location within each of the discontinuous spiral tracks such that the gaps are aligned radially across the disk 18. FIG. 6B shows the product servo sectors (e.g., product servo sectors $56_0$ and $56_1$) written in the gaps, wherein in this embodiment a width of each gap along a circular path of the disk is substantially equal to a width of a product servo sector.

Figure 7A:
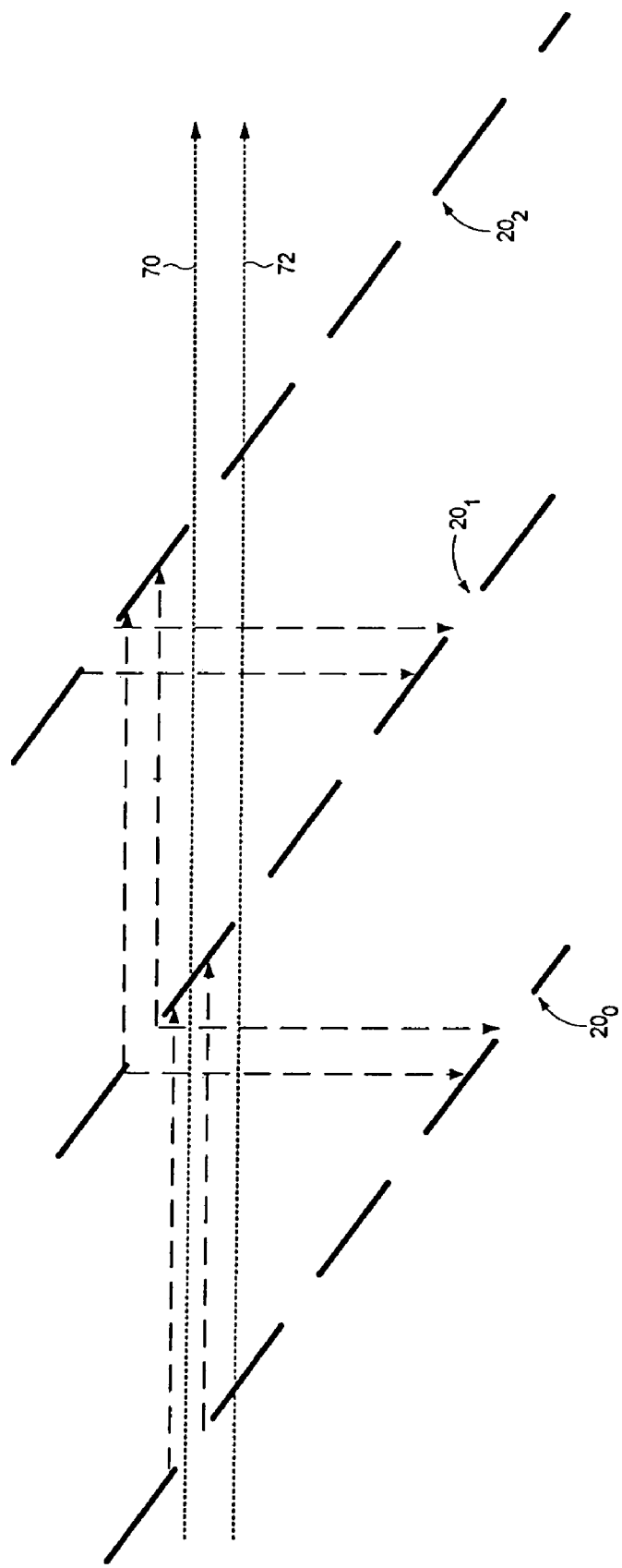
FIG. 7A shows an embodiment of the present invention wherein the discontinuous spiral tracks are written at a constant interval.
Figure 7B:
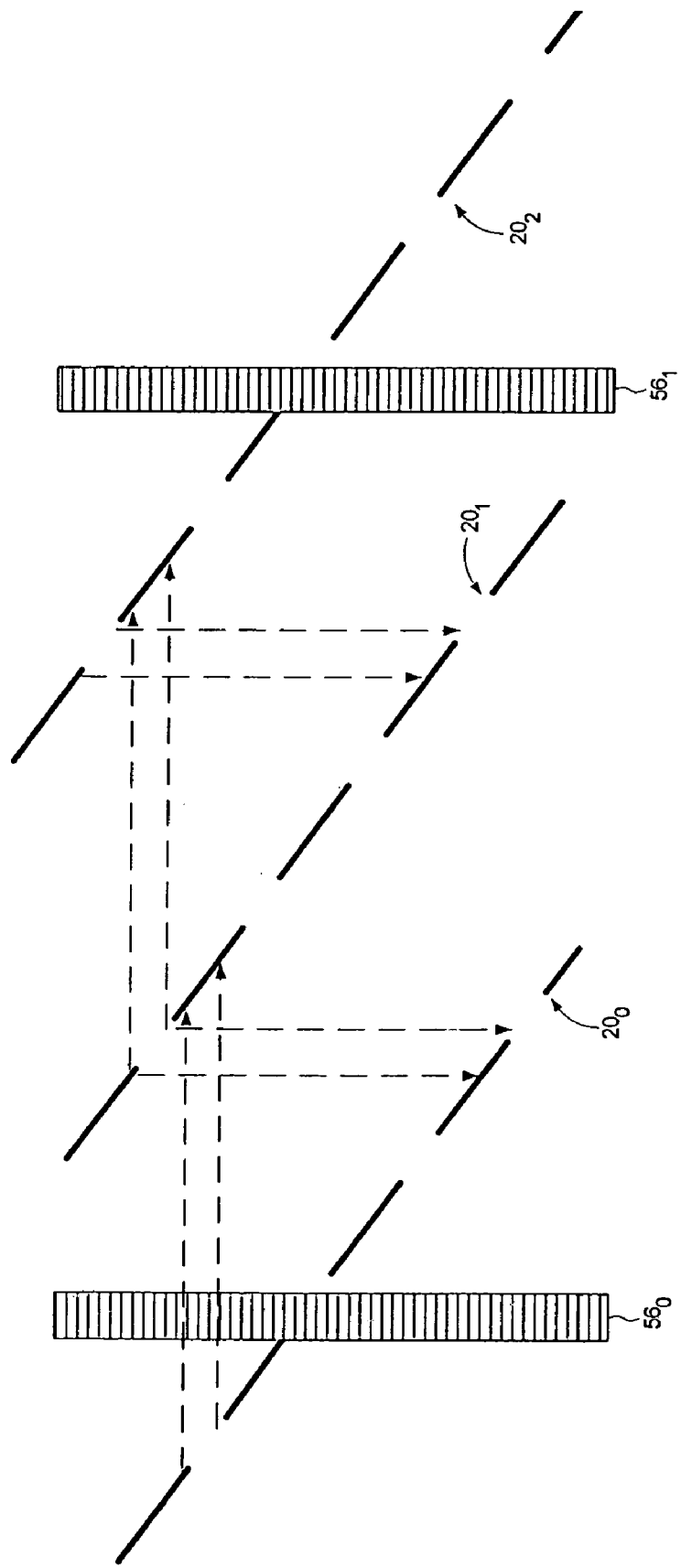
FIG. 7B shows an embodiment wherein a wedge of product servo sectors is written at every other discontinuous spiral track.

In the embodiment of FIG. 6A, the pairs of discontinuous spiral tracks (e.g., $20_0$-$20_1$ and $20_2$-$20_3$) ensures that a timing recovery and PES measurement can be made at a predetermined interval around the disk. That is, one or the other discontinuous spiral track in the pair can always be read since a gap in one of the tracks overlaps a segment in the other track. In an alternative embodiment shown in FIG. 7A, the discontinuous spiral tracks $20_0$-$20_N$ are distributed equally around the disk. This embodiment still allows a timing recovery and PES measurement to be made at a predetermined interval, wherein the interval is time shifted as the head moves radially across the disk. For example, when servoing along circular path 70, the odd numbered discontinuous spiral tracks ($20_1$, $20_3$, . . . ) are processed, and when servoing along circular path 72, the even numbered discontinuous spiral tracks ($20_0$, $20_2$, . . . ) are processed. FIG. 7A also shows that the gaps are aligned radially and that along a circular path a gap in a first discontinuous spiral track (e.g., $20_0$) overlaps a segment in a second discontinuous spiral track (e.g., $20_1$). FIG. 7B shows the product servo sectors (e.g., product servo sectors $56_0$ and $56_1$) written in the gaps, wherein the product servo wedges occur at a frequency (around the disk) at half the frequency of the discontinuous spiral tracks. That is, twice as many discontinuous spiral tracks are written as product servo wedges.

Figure 8A:
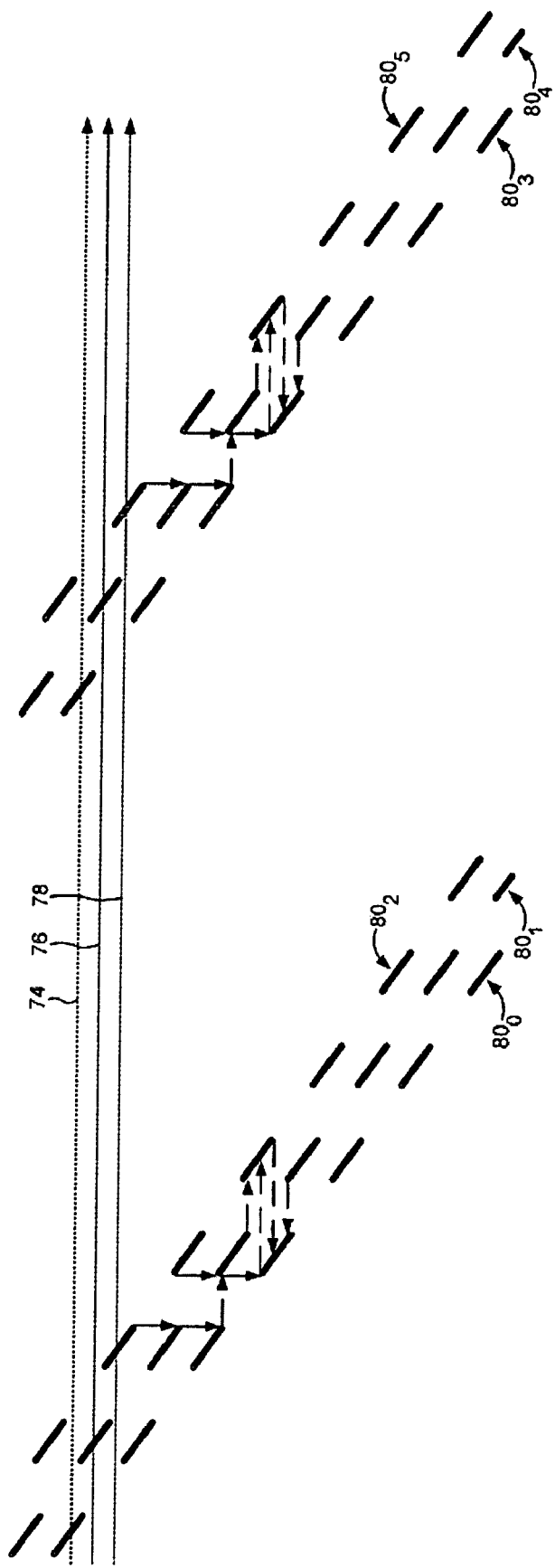
FIG. 8A shows an embodiment of the present invention wherein the gap length is increased (and heating reduced) by increasing the number of discontinuous spiral tracks written to the disk.

FIG. 8A shows an embodiment of the present invention wherein the gap length is increased (and heating reduced) by increasing the number of discontinuous spiral tracks written to the disk 18. This embodiment enables a gap length that is longer than a segment of the high frequency signal within a discontinuous spiral track. Referring to FIG. 8A, along circular path 74 the discontinuous spiral tracks $80_0$, $80_3$, $80_6$, . . . are processed, along circular path 76 the discontinuous spiral tracks $80_1$, $80_4$, $80_7$, . . . are processed, and along circular path 78 the discontinuous spiral tracks $80_2$, $80_5$, $80_8$, . . . are processed. In the embodiment of FIG. 8A, the gaps align radially and each gap in one of the discontinuous spiral track is overlapped by segments from each of the other discontinuous spiral tracks to ensure intersection with at least one segment along any circular path. FIG. 8B shows the product servo sectors (e.g., product servo sectors $56_0$ and $56_1$) written in the gaps, wherein a width of each product servo sector is less than the gap width such that the product servo sectors are written within the gaps without overwriting any part of the segments. In the embodiment of FIG. 8B, the discontinuous spiral tracks occur (around the disk) at three times the frequency of the product servo wedges. That is, three times as many discontinuous spiral tracks are written as product servo wedges.

Figure 9:
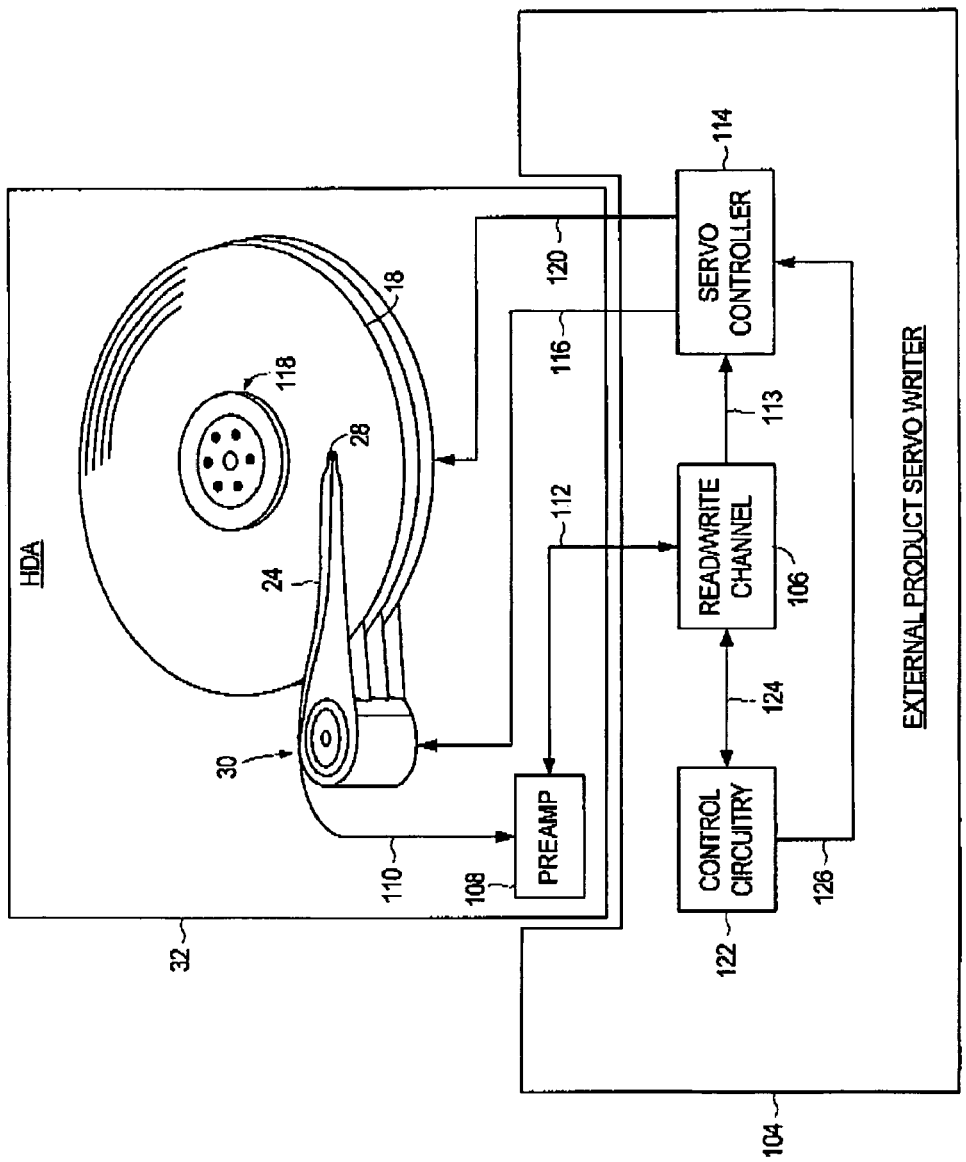
FIG. 9 shows an embodiment of the present invention wherein an external product servo writer is used to process the spiral tracks in order to write the product servo sectors to the disk.
Figure 10:
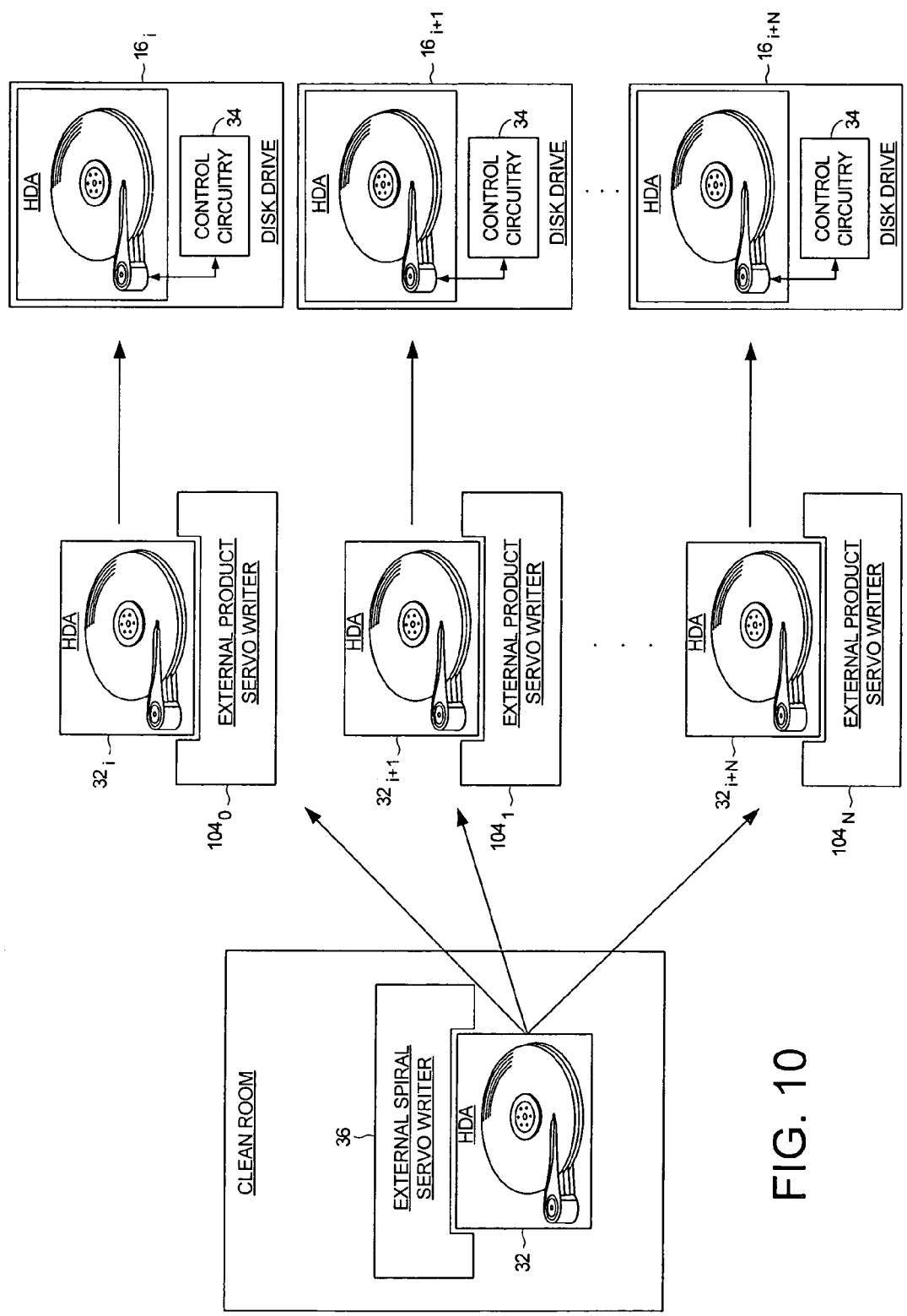
FIG. 10 shows an embodiment of the present invention wherein an external spiral servo writer is used to write the spiral tracks, and a plurality of external product servo writers write the product servo sectors for the HDAs output by the external spiral servo writer.

FIG. 9 shows an embodiment of the present invention wherein after writing the discontinuous spiral tracks $20_0$-$20_N$ to the disk 18 (FIGS. 2A-2B), the HDA 32 is inserted into an external product servo writer 104 comprising suitable circuitry for reading and processing the discontinuous spiral tracks $20_0$-$20_N$ in order to write the product servo sectors $56_0$-$56_N$ to the disk 18. The external product servo writer 104 comprises a read/write channel 106 for interfacing with a preamp 108 in the HDA 32. The preamp 108 amplifies a read signal emanating from the head 28 over line 110 to generate an amplified read signal applied to the read/write channel 106 over line 112. The read/write channel 106 comprises circuitry for generating servo burst signals 113 applied to a servo controller 114. The servo controller 114 processes the servo burst signals 113 to generate the PES. The PES is processed to generate a VCM control signal applied to the VCM 30 over line 116 in order to maintain the head 28 along a circular path while writing the product servo sectors $56_0$-$56_N$. The servo controller 114 also generates a spindle motor control signal applied to a spindle motor 118 over line 120 to maintain the disk 18 at a desired angular velocity. Control circuitry 122 processes information received from the read/write channel 106 over line 124 associated with the discontinuous spiral tracks $20_0$-$20_N$ (e.g., timing information) and provides the product servo sector data to the read/write channel 106 at the appropriate time. The product servo sector data is provided to the preamp 108 which modulates a current in the head 28 in order to write the product servo sectors $56_0$-$56_N$ to the disk 18. The control circuitry 122 also transmits control information over line 126 to the servo controller 114 such as the target servo track to be written. After writing the product servo sectors $56_0$-$56_N$ to the disk 18, the HDA 32 is removed from the external product servo writer 104 and a printed circuit board assembly (PCBA) comprising the control circuitry 34 (FIG. 2A) is mounted to the HDA 32.

Figure 11:
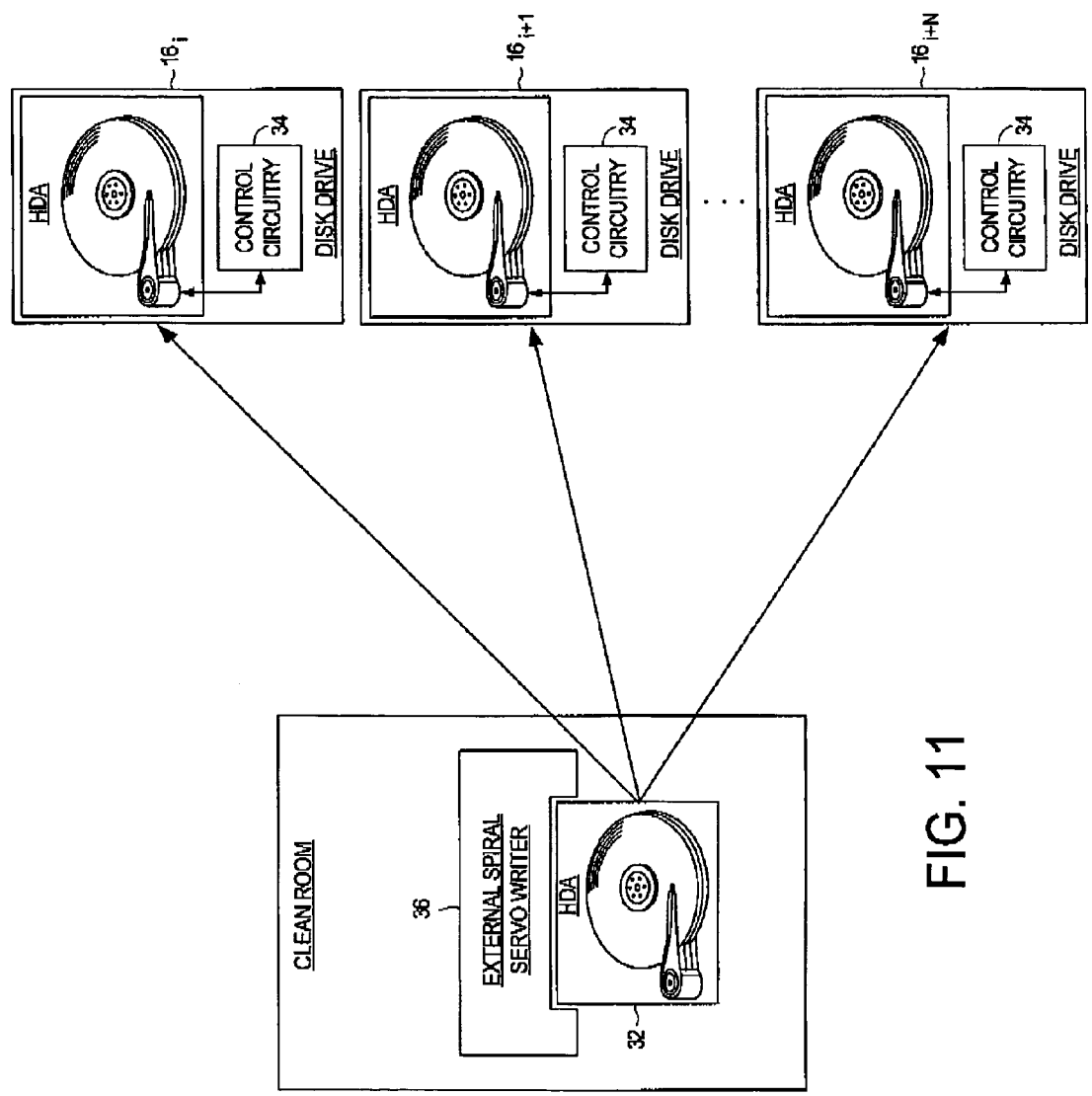
FIG. 11 shows an embodiment of the present invention wherein an external spiral servo writer is used to write the spiral tracks, and the control circuitry within each product disk drive is used to write the product servo sectors.

In one embodiment, the external product servo writer 104 of FIG. 9 interfaces with the HDA 32 over the same connections as the control circuitry 34 to minimize the modifications needed to facilitate the external product servo writer 104. The external product servo writer 104 is less expensive than a conventional servo writer because it does not require a clean room or sophisticated head positioning mechanics. In an embodiment shown in FIG. 10, a plurality of external product servo writers $104_0$-$104_N$ process the HDAs $32_i$-$32_{i+N}$ output by an external spiral servo writer 36 in order to write the product servo sectors less expensively and more efficiently than a conventional servo writer. In an alternative embodiment shown in FIG. 11, an external spiral servo writer 36 is used to write the discontinuous spiral tracks, and the control circuitry 34 within each product disk drive $16_i$-$16_{i+N}$ is used to write the product servo sectors.

We claim:

1. A method of writing discontinuous spiral tracks on a disk for use in a disk drive, the method comprising the steps of:

(a) synchronizing a write clock to the rotation of the disk; and (b) writing a plurality of discontinuous spiral tracks on the disk, wherein:

each discontinuous spiral track is written at a predetermined circular location determined from the write clock;

each discontinuous spiral track comprises a plurality of segments separated by gaps; and each segment comprises a high frequency signal interrupted at a predetermined interval by a sync mark.

2. The method as recited in claim 1, wherein:
(a) the disk drive comprises an actuator arm and a head coupled to a distal end of the actuator arm; and
(b) the head is used to write the discontinuous spiral tracks on the disk.

3. The method as recited in claim 1, wherein an external servo writer is used to write the discontinuous spiral tracks on the disk.

4. The method as recited in claim 1, wherein the gaps within each discontinuous spiral track occur at a position determined from the write clock.

5. The method as recited in claim 1, wherein the gaps occur at substantially the same circular location within each of the discontinuous spiral tracks such that the gaps are aligned radially across the disk.

6. The method as recited in claim 1, wherein along a circular path on the disk a gap in a first discontinuous spiral track overlaps a segment in a second discontinuous track.

7. A method of writing product servo sectors on a disk of a disk drive, the disk drive comprising control circuitry and a head disk assembly (HDA) comprising the disk, an actuator arm, a head coupled to a distal end of the actuator arm, and a voice coil motor for rotating the actuator arm about a pivot to position the head radially over the disk, the disk comprising a plurality of discontinuous spiral tracks, wherein each discontinuous spiral track comprises a plurality of segments separated by gaps and each segment comprises a high frequency signal interrupted at a predetermined interval by a sync mark, the method comprising the steps of:

(a) using the head internal to the disk drive to read the sync marks in the segments of the discontinuous spiral tracks to synchronize a servo write clock; and (b) using the servo write clock to write the product servo sectors to the disk.

8. The method as recited in claim 7, wherein each product servo sector is written over at least part of the gaps in the discontinuous spiral tracks.

9. The method as recited in claim 8, wherein a width of each gap along a circular path of the disk is substantially equal to a width of a product servo sector along the circular path of the disk.

10. The method as recited in claim 8, wherein a width of each gap along a circular path of the disk is greater than a width of a product servo sector along the circular path of the disk.

11. The method as recited in claim 7, wherein the gaps in each of the discontinuous spiral tracks occur at substantially the same circular location within each of the discontinuous spiral tracks such that the gaps are aligned radially across the disk.

12. The method as recited in claim 11, wherein each product servo sector is written over at least part of the gaps in the discontinuous spiral tracks.

13. The method as recited in claim 12, wherein a width of each gap along a circular path of the disk is substantially equal to a width of a product servo sector along the circular path of the disk.

14. The method as recited in claim 12, wherein a width of each gap along a circular path of the disk is greater than a width of a product servo sector along the circular path of the disk.

15. The method as recited in claim 7, wherein along a circular path on the disk a gap in a first discontinuous spiral track overlaps a segment in a second discontinuous spiral track.

16. A disk drive comprising:
(a) a disk comprising a plurality of discontinuous spiral tracks, wherein each discontinuous spiral track comprises a plurality of segments separated by gaps and each segment comprises a high frequency signal interrupted at a predetermined interval by a sync mark;
(b) an actuator arm;
(c) a head coupled to a distal end of the actuator arm;
(d) a voice coil motor for rotating the actuator arm about a pivot to position the head radially over the disk; and
(e) control circuitry for:
reading the sync marks in the segments of the discontinuous spiral tracks to synchronize a servo write clock; and
using the servo write clock to write product servo sectors to the disk.

17. The disk drive as recited in claim 16, wherein the control circuitry for writing each product servo over at least part of the gaps in the discontinuous spiral tracks.

18. The disk drive as recited in claim 17, wherein a width of each gap along a circular path of the disk is substantially equal to a width of a product servo sector along the circular path of the disk.

19. The disk drive as recited in claim 17, wherein a width of each gap along a circular path of the disk is greater than a width of a product servo sector along the circular path of the disk.

20. The disk drive as recited in claim 16, wherein the gaps in each of the discontinuous spiral tracks occur at substantially the same circular location within each of the discontinuous spiral tracks such that the gaps are aligned radially across the disk.

21. The disk drive as recited in claim 20, wherein the control circuitry for writing each product servo over at least part of the gaps in the discontinuous spiral tracks.

22. The disk drive as recited in claim 21, wherein a width of each gap along a circular path of the disk is substantially equal to a width of a product servo sector along the circular path of the disk.

23. The disk drive as recited in claim 21, wherein a width of each gap along a circular path of the disk is greater than a width of a product servo sector along the circular path of the disk.

24. The disk drive as recited in claim 16, wherein along a circular path on the disk a segment in a first discontinuous spiral track overlaps a gap in a second discontinuous spiral track.

* * * * *